United States Patent [19]

Carlsen et al.

[11] 4,276,113
[45] Jun. 30, 1981

[54] WINGED V-GROOVE FIBER OPTIC CLAMP AND SPLICER

[75] Inventors: W. John Carlsen, Natick; Mark L. Dakss, Sudbury; Gary M. Lambert, Berlin, all of Mass.

[73] Assignee: GTE Laboratories Incorporated, Waltham, Mass.

[21] Appl. No.: 81,730

[22] Filed: Oct. 4, 1979

[51] Int. Cl.³ .............................................. G02B 5/16
[52] U.S. Cl. .................................... 156/502; 156/158; 350/96.21
[58] Field of Search .............. 156/157, 158, 159, 502, 156/304; 350/296, 96.20, 96.21, 96.22; 29/869; 140/147; 269/321 N, 321 W

[56] References Cited

U.S. PATENT DOCUMENTS

| 3,864,018 | 2/1975 | Miller | 350/96.21 |
| 3,919,037 | 11/1975 | Miller | 156/158 |
| 4,029,390 | 6/1977 | Chinnock et al. | 156/158 |
| 4,045,121 | 8/1977 | Clark | 350/96.21 |
| 4,088,386 | 5/1978 | Hawk | 350/96.21 |
| 4,102,561 | 7/1978 | Hawk et al. | 350/96.21 |
| 4,179,186 | 12/1979 | Tynes | 350/96.21 |

OTHER PUBLICATIONS

"Optical Fiber Connector", Dalgleish & Lucas, *Electronics Letters;* Jan. 9, 1975, vol. 11, No. 1, pp. 25-26.

Primary Examiner—Michael W. Ball
Attorney, Agent, or Firm—Fred Fisher

[57] ABSTRACT

Optical fibers are held and aligned by means of a base member and a cover. The base member has a longitudinal recessed V-shaped groove along a fiber engaging face thereof, and a plurality of rectangular transverse slots spaced along the groove. The slots extend to a depth extending the groove. The cover has a longitudinal extended V-shaped protuberance along a face of the cover which engages the base member. The protuberance corresponds in size and shape to the recessed V-shaped groove, but is blunt at its apex. A plurality of rectangular transverse inverted V-shaped fingers are spaced along the protuberance, and are blunt at their apices. The fingers have a length not exceeding the depth of the slots.

A system for splicing two optical fibers in alignment with each other utilizes three of the foregoing clamps, two to hold the fibers temporarily in place and one as the splice part itself. Optical adhesive is used for affixing the ends of the fibers and the splice clamp to each other.

12 Claims, 5 Drawing Figures

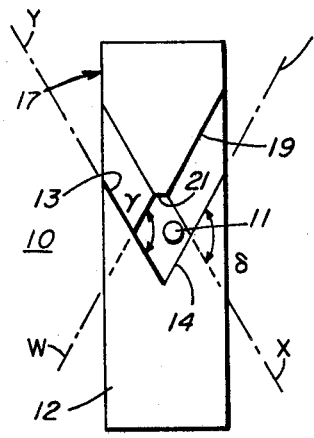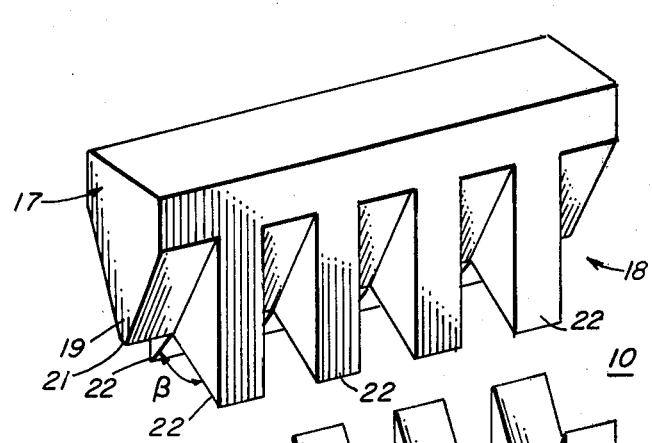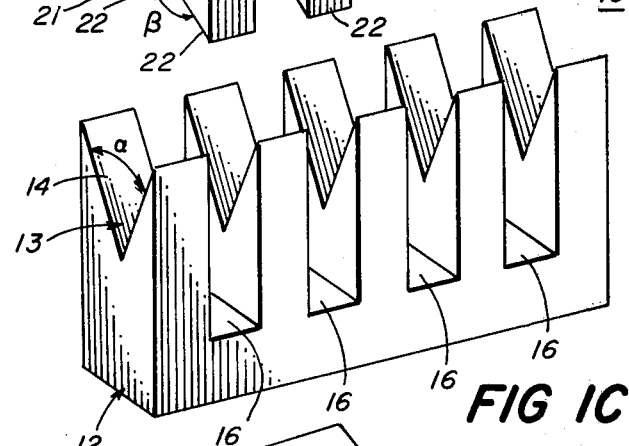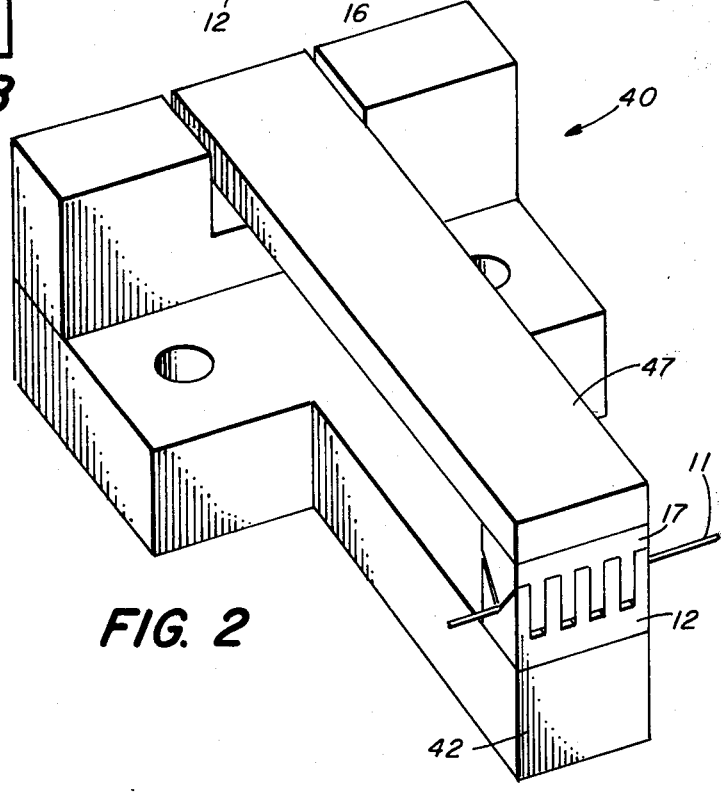
FIG. 1A
FIG. 1B
FIG. 1C
FIG. 2

WINGED V-GROOVE FIBER OPTIC CLAMP AND SPLICER

CROSS-REFERENCE TO RELATED APPLICATION

The application of Gary M. Lambert (one of the coinventors of this application), Ser. No. 019,961 filed Mar. 12, 1979, entitled "Fiber Optic Connectors and Methods of Affixing Optical Fibers Thereto" is related to this application and has been assigned to the common assignee of this application.

BACKGROUND OF THE INVENTION

1. Field of the Invention

This invention relates to winged V-groove fiber optic clamps and splicers. Accordingly, it is a general object of this invention to provide new and improved clamps and splicers of such character.

2. Description of the Prior Art

Non-aligning clamping or holding mechanisms have been used in the past in conjunction with micro-manipulators for moving such mechanisms until the optical fibers are in place. Disadvantageously, micro-manipulators are very expensive, and often too bulky to use conveniently. Three translation stages and two rotation stages are needed for complete alignment, although usually the rotation stages are not used because of cost considerations. Even more significant, most fiber clamps used in these setups produce microbends in the fiber when clamped; these microbends cause power to be lost from the fiber, and power measurements made when the fiber is clamped are therefore not consistent or representative of the power flowing when the fiber is unclamped.

Precision V-grooves have been used in the past, wherein the fiber is placed accurately into the bottom of the groove, sometimes followed by a mating V-shaped cover to hold the fiber in place. Disadvantageously, though a V-groove is a very high precision alignment mechanism for a cylindrical object such as an optical fiber, this is only true when the fiber is fully as far down into the groove as it can go, with the fiber in contact with both walls of the V along its full length. This usually requires that the fiber be bent or moved externally until it settles down into the groove bottom, or that it can be forced down with a probe; in either case it is necessary to watch the operation under a microscope to really be sure when the fiber is in place. The use of a mating V-shaped cover does not, in general, push the fiber down to the bottom of the groove by itself. When the fiber is not already in place, the cover often breaks the fiber or causes additional microbending losses. In general, unless the fiber is initially well placed, the cover holds the fiber firmly, but often out of the proper alignment and with high optical power loss.

Other prior art systems utilize a very shallow V-groove, such that the fiber extends above the top of the groove even when firmly in place, and uses a cover which is either flat or contains another V-groove. Disadvantageously, it is extremely difficult to get the fiber to lie within such a groove without micro-manipulators or precision pre-aligned ferrules. Such V-grooves, presently, have found little application except in expensive fiber splicing machines complete with manipulators and microscope.

SUMMARY OF THE INVENTION

Another object of this invention is to provide for a new and improved fiber optic clamp which has the property of quickly, simply, precisely, firmly, and repeatably aligning and holding optical fibers along a predetermined axis.

Yet another object of this invention is to provide for a new and improved fiber optic clamp which exhibits extremely low clamping loss due to fiber microbends, and accommodates a wide range of fiber sizes.

Still another object of this invention is to provide for a new and improved fiber optic clamp which has applications as (a) a general-purpose low-loss fiber clamp for firmly holding a fiber in place against external tensions and torques, (b) a precision clamp for precisely and repeatably holding a fiber, or a succession of different fibers, along a given axis, and (c) a low-loss optical fiber splicer.

In accordance with one embodiment of this invention, apparatus for aligning and holding optical fibers along a predetermined axis includes two mating parts: a base member having a fiber engaging face, and a cover having a face for engaging the base member. The base member has a longitudinal recessed V-shaped groove along its face. A plurality of rectangular transverse slots are spaced along the groove, the slots extending to a depth exceeding the groove. The cover has a longitudinal extended V-shaped protuberance along the engaging face of the cover. The protuberance corresponds in size and shape to the recessed V-shape groove, but is blunt at its apex. A plurality of rectangular transverse inverted V-shaped fingers are spaced along the protuberance, and are blunt at their apices, the fingers having a length not exceeding the depth of the slots.

In accordance with certain features of the invention, the V-shaped protuberance is blunt for a transverse distance equal to the diameter of the held optical fibers. The blunt apex of the V-shaped protuberance and the blunt apices of the V-shaped fingers are co-aligned. The V-shaped groove forms an included angle $\alpha$, and the V-shaped fingers form an included angle $\beta$, where $(\alpha + \beta)$ is less than 180°. The transverse inverted V-shape fingers have included surfaces which lie in a pair of intersecting planes W and X, and the V-shaped groove has included surfaces which lie in a pair of intersecting planes Y and Z, wherein the plane W intersects with the plane Y in an interior angle $\gamma$, the plane X intersects with the plane Z in an interior angle $\delta$, wherein $\gamma$ is greater than 90°, and wherein $\delta$ is greater than 90°. The apparatus includes two mating molded plastic parts. The bottom of the fingers each form an angle 90° or larger with respect to the sides of the V-shaped groove, whereby the fingers exert forces on an optical fiber with no component of force directed into the V-groove sides. The plurality of slots and the plurality of V-shaped fingers are each at least two; preferably, each plurality should be at least four.

In accordance with other features of the invention, a device for splicing two optical fibers in alignment with each other includes the base member and cover described hereinabove, together with optical adhesive for affixing the fibers, the base member, and cover together. A system for splicing two optical fibers in alignment with each other utilizes three of the foregoing clamps, two to hold the fibers temporarily in place and one as the splice part itself, optical adhesive being used for affixing the ends of the fibers and the splice clamp to each other.

BRIEF DESCRIPTION OF THE DRAWINGS

Other objects, advantages, and features of this invention, together with its construction and mode of operation, will become more apparent from the following description, when read in conjunction with the accompanying drawing, in which:

FIGS. 1a, 1b, and 1c are a disengaged side view, an engaged side view, and an exploded perspective view, respectively, of one embodiment of this invention;

FIG. 2 is a perspective view of the embodiment shown in FIG. 1 in use as a general purpose fiber holding and aligning device.

DESCRIPTION OF THE PREFERRED EMBODIMENTS

Figure 3:
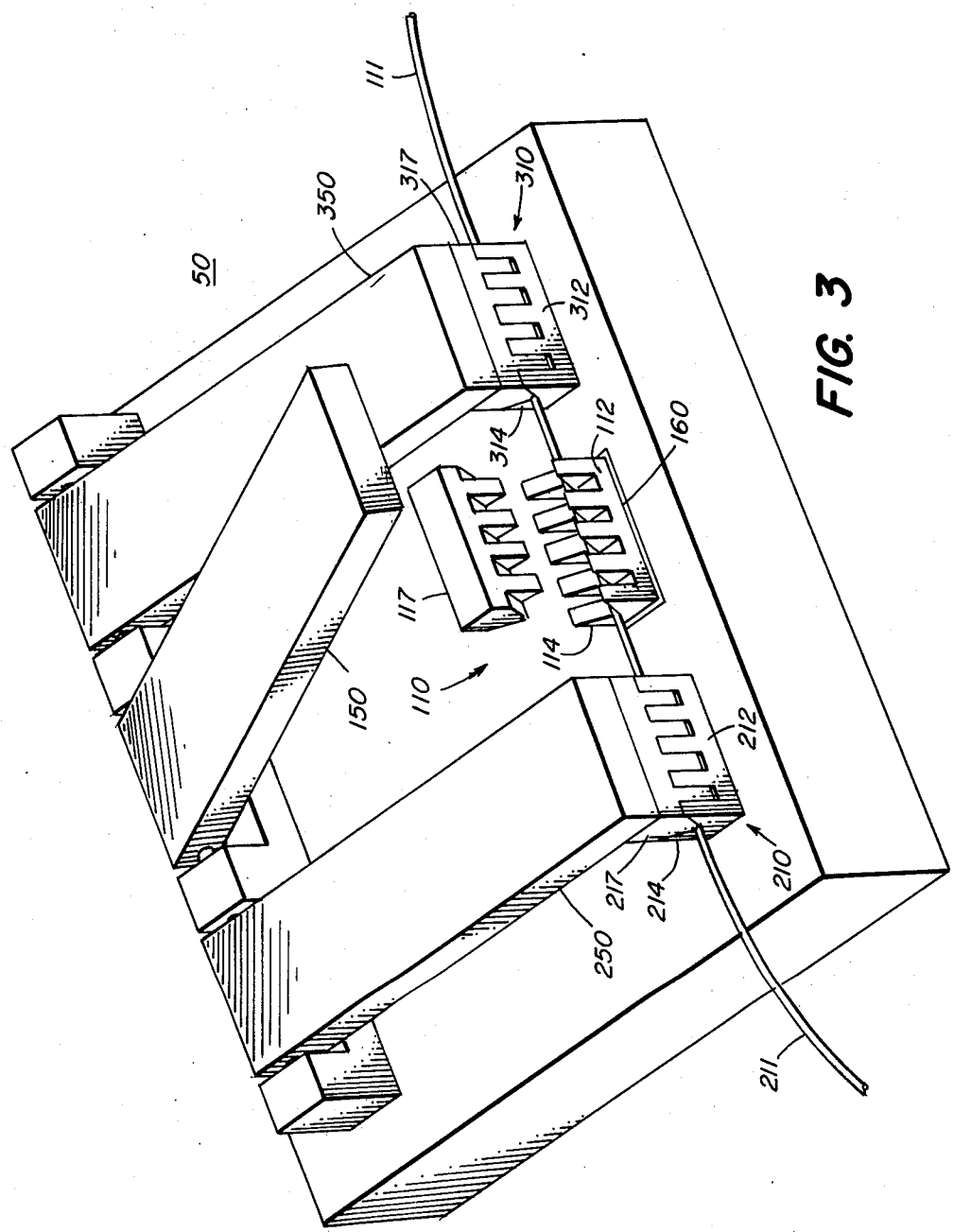
FIG. 3 is a perspective view of apparatus for making optical fiber splices in accordance with an embodiment of this invention.

By utilizing a conventional V-groove fiber holder/aligner with a mating V-shaped cover, and assuming that an optical fiber is initially at or very near the bottom of the groove, the cover can hold the fiber firmly at three points all along the length of the groove. The bottom point of the cover can be flattened slightly rather than sharp; keeping it from being easily damaged and then exerting uneven pressure on the fiber along the groove length. The flattened surface should not be made much wider than the diameter of the fiber; if it is too wide, the mating sides of the cover and base can come into solid contact with one another rather than each contacting the fiber separately.

When the fiber is firmly held by the three flat surfaces of the groove and cover, it becomes aligned along the groove axis to a high degree of accuracy, and when the base and cover are made of a sufficiently rigid material and to sufficient precision, no microbending losses are introduced. However, initially getting the fiber to the bottom of the V-groove is fortuitous or is a very careful and tedious operation under a microscope. A fiber which is initially not at the bottom of the V-groove can get held in an improper location by the V-shaped cover, whereby the fiber often gets bent, twisted, or even broken in this situation when pressure is applied to the cover to clamp the fiber.

The embodiment of our invention, as depicted in FIGS. 1a, 1b, and 1c, completely solves the foregoing problems. Apparatus 10 for aligning and holding an optical fiber 11 includes a base member 12 having a fiber engaging face 13 and a longitudinal recessed V-shaped groove 14 along the face 13 of the base member 12. A plurality (preferably, four) of rectangular transverse slots 16—16 are spaced along the groove 14, the slots 16—16 extending to a depth exceeding the groove 14.

A cover 17 has a face 18 for engaging the base member 12, and has a longitudinal recessed V-shaped protuberance 19 along the engaging face 18 of the cover 17. The protuberance 19 corresponds in size and shape to the recessed V-shaped groove 14, but is blunt at its apex 21. The cover 17 further has a plurality of rectangular, transverse inverted V-shaped "wings" or fingers 22—22 spaced along the protuberance 19. The fingers 22—22 are blunt at their apices, and have a length not exceeding the depth of the slots 16—16.

In operation, the basic V-groove clamping and aligning action described above with a conventional holder/aligner remains the same, but has been improved by significant geometrical modifications: (a) slots 16—16 have been cut completely through and below the V-groove 14 in the base 12 to make room for (b) pairs of "wings" or fingers 22—22 extending outward and downward from the side of the mating V-shaped cover 17. FIGS. 1a and 1b depict how, as the two parts 12, 17 of the clamp come together, even an initially very misaligned fiber 11 is guided by the wings 22—22 down to the bottom of the groove 14, where it is then aligned and held securely. When, in particular, the internal angle $\gamma$ or $\delta$ formed between the slanted sides of the wings 22—22 and the V-groove walls is greater than 90°, then the action of the wings 22—22 tends to scoop the fiber 11 away from the V-groove walls as it is being guided into place. If, disadvantageously, this angle were to be made less than 90°, then when the wing 22 encountered a fiber 11 lying along a wall of the V-groove 14, a component of the force exerted on the fiber 11 by the wing 22 would be directed into the wall. Assuming a finite amount of friction, adhesion, and/or static electrical attraction between the fiber 11 and the wall or wing 22, the fiber 11 could become jammed between the wing 22 and the wall.

As a result of numerous experiments and design changes, the following set of design features have been found advantageous: The clamp parts 12, 17 are molded of rigid plastic in a precision mold which yields very smooth and accurate surfaces on the parts which contact the fiber 11. Emerson & Cuming Stycast 2057 epoxide casting material can be used. The V-groove 14, preferably, has an angle of 60° between its two sides, and the bottoms of the wings 22—22 can have an angle between them from 60° to about 90°. The width of the flat bottom surface 21 of the V-shaped cover 17 between the wings 22—22 is equal to the fiber 11 diameter. At least two pairs of wings 22—22 are used to clamp a single fiber 11, at least four pairs of wings 22—22 are used to hold two fibers 11—11 in alignment to one another as described below for splicers. The clamp can be made very small, but for ease of use, it should be large enough to make it easy to drop the fiber 11 into the V-groove 14 area by hand. (It is not necessary to lay the fiber 11 in the bottom of the groove 14, only somewhere within the large triangular trough). A single design for all applications is considered here to show its versatility; it has four pairs of wings 22—22 (as in FIG. 1), and when clamped it has outside dimensions of 1.5 mm wide by 4 mm high by 9 mm long.

Referring to FIG. 2, there is illustrated an application of our novel molded fiber clamp as a simple-to-use general-purpose fiber holding and aligning device. As shown, the molded parts 12, 17 are epoxied or otherwise attached to opposing parts 42, 47 of a simple hinge mechanism 40. In use, the top 47, which holds the cover 27, is simply raised upward away from the base 42 which holds the base member 12. The fiber 11 is then dropped into the V-groove 14, and then the cover 17 (and the top 47) is simply lowered onto the fiber 11. The wings 22—22 automatically guide the fiber 11 into place at the bottom of the V-groove 14, and successive clampings of the same fiber 11, or of different fibers 11—11 of the same diameter, cause the fiber 11 to be aligned along the same axis each time. Depending upon the application, and the degree of fiber gripping desired, the top can be held in place by the force of gravity alone, by a fixed or adjustable spring tension, or by a solid screw-tightened mechanism. The clamping device can be designed as an integral part of a larger fiber-optical component, or manufactured as a single device as described, to be attached to another component as required.

Referring to FIG. 3, there is depicted a system 50 for quickly and easily performing high quality optical fiber splices.

One molded V-groove clamp 110 including a base member 112 and a winged cover 117, similar to that described with reference to FIG. 1, is used for splicing two optical fibers 111, 211. Two molded V-groove clamps 210, 310, including members 212, 217 and 312, 317, respectively, are used as permanent parts for holding the fibers in stable alignment during the splicing operation. The molded V-groove base and cover parts 212, 217, 312, 317 are permanently attached to outer two spring-loaded hinged clamping mechanism 250, 350, respectively. A central unit 150 is similar, except that the molded parts 112, 117 are not attached. The base plate of this unit 150 has a rectangular slot 160 into which a molded V-groove part 112 can be dropped. The three units 150, 250, 350 are initially positioned so that the one temporary and two permanent V-grooves 114, 214, 314 are closely aligned; then everything is tightened down and the alignment is retained for succeeding splices.

The use of the splicer 50 is as follows: Initially, all three hinges 150, 250, 350 are up, and a molded V-groove base part 112 is dropped into the rectangular slot 160. A clean, cleaved fiber 111 is placed in one of the end V-grooves 314, and half-way into the central one 114. The end clamp 350 is then lowered until the winged V-shaped cover 317 contacts the fiber 111. The spring tension of the clamp 350 is such as to align and hold the fiber 111 in place normally, but low enough that an operator can push or pull the fiber 111 from outside and overcome the clamping tension and move the fiber 111 along its own axis. The fiber 111 is thus adjusted by pushing or pulling until the end of the fiber 111 is approximately midway along the central section 110 of the V-groove 114. Then a similar fiber 211 is placed in the other end clamp 210 and adjusted along its axis until it is butting with the first fiber 111 at the center of the V-groove 114. (This can all be done with the unaided eye, and the operator's fingers can easily feel when the butting occurs). A small amount of optically clear epoxy (not shown) or other optical adhesive is then dropped onto the fiber junction 111–211 and along the V-groove 114. A mating molded cover piece 117 is then placed on top of the fibers 111–211, and the spring-loaded central hinge 150 is lowered to clamp the two fibers 111–211 in alignment until the epoxy cures. If desired, a heater can be incorporated into the base of the splicing device 50 to hasten the cure. When the cure is complete, all three hinges 150, 250, 350 are raised, and the spliced fibers 111–211 with central epoxied splicing unit 110 are removed together. The final splice 110, being very small and made of plastic, yields a light, low-loss, permanent junction between the two fibers 111–211.

In summary, this invention has distinct advantages over non-V-groove devices. Among these are ease of use, automatic positioning and alignment, versatility of application, very low clamping loss even when holding the fiber firmly, low-cost molded fabrication, and qualities of being small and light enough to serve as an in-line fiber splicer.

Various modifications can be performed, without departing from the spirit and scope of this invention, by those ordinarily skilled in the art. Due to the versatility of the invention, the fiber clamp can be produced in a variety of ways. In particular: (a) dimensions can be modified to make the V-groove wider for even easier fiber insertion, or smaller for miniature devices; (b) the number of wings can be changed; (c) angles of V-groove walls and wing bottoms can be optimized for specific materials or applications; (d) the V-groove and cover can be molded or otherwise fabricated as integral parts of a larger device; (e) the splicer depicted in FIG. 3 can have one or both end clamps on adjustable slides to facilitate positioning the two fibers end-to-end.

What is claimed is:

1. Apparatus for aligning and holding optical fibers along a predetermined axis comprising:
   (a) a base member having a fiber engaging face, and
      (i) a longitudinal recessed V-shaped groove along said face of said base member;
      (ii) a plurality of rectangular transverse slots spaced along said groove, said slots extending to a depth exceeding said groove; and
   (b) a cover having a face for engaging said base member, and
      (i) a longitudinal extended V-shaped protuberance along said engaging face of said cover, said extended V-shaped protuberance corresponding in size and shape to said recessed V-shaped groove but being blunt at its apex; and
      (ii) a plurality of rectangular transverse inverted V-shaped fingers spaced along said protuberance, and blunt at their apices, said fingers having a length not exceeding said depth of said slots.

2. Apparatus as recited in claim 1 for holding optical fibers having a diameter of dimension d, wherein said V-shaped protuberance is blunt for a transverse distance of said dimension d.

3. Apparatus as recited in claim 1 wherein said blunt apex of said V-shaped protuberance and said blunt apices of said V-shaped fingers are co-aligned.

4. Apparatus as recited in claim 1 wherein said V-shaped groove forms an included angle $\alpha$, said V-shaped fingers form an included angle $\beta$, and $(\alpha+\beta)$ is less than 180°.

5. Apparatus as recited in claim 1 wherein said transverse inverted V-shaped fingers have included surfaces which lie in a pair of intersecting planes W and X, wherein said V-shaped groove has included surfaces which lie in a pair of intersecting planes Y and Z, wherein plane W intersects with plane Y in an interior angle $\gamma$, wherein plane X intersects with plane Z in an interior angle $\delta$, wherein $\gamma > 90°$, and wherein $\delta > 90°$.

6. Apparatus as recited in claim 1 wherein said base member is integral, and wherein said cover is integral.

7. Apparatus as recited in claim 6 wherein said base member and said cover are each formed of molded plastic.

8. Apparatus as recited in claim 1 wherein the bottom of said fingers each form an angle at least 90° with respect to the sides of said V-shaped groove, whereby said fingers exert forces on an opticl fiber with no component of force directed into the V-groove sides.

9. Apparatus as recited in claim 1 wherein said plurality of slots is at least two, and wherein said plurality of V-shaped fingers is at least two.

10. Apparatus as recited in claim 1 wherein said plurality of slots is at least four, and wherein said plurality of V-shaped fingers is at least four.

11. A device for splicing two optical fibers in alignment with each other comprising:
(a) apparatus as recited in claim 1, and
(b) optical adhesive for affixing said fibers, said base member and said cover together.

12. A system for splicing two optical fibers in alignment with each other comprising:
(a) first apparatus as recited in claim 1 for temporarily holding one of said fibers in place;
(b) second, but separate, apparatus as recited in claim 1 for temporarily holding the second of said fibers in place, whereby an end of each of said fibers are in abutting relation to each other;
(c) third, and separate, apparatus as recited in claim 1 for permanently holding said ends of said fibers together; and
(d) optical adhesive for affixing said ends of said fibers and said third apparatus to each other.

* * * * *